United States Patent
Tonar et al.

(10) Patent No.: US 10,321,122 B2
(45) Date of Patent: Jun. 11, 2019

(54) VEHICLE DISPLAY SYSTEM PROVIDING DEPTH INFORMATION

(71) Applicant: Gentex Corporation, Zeeland, MI (US)

(72) Inventors: William L. Tonar, Holland, MI (US); Andre J. Rieder, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 40 days.

(21) Appl. No.: 15/487,065

(22) Filed: Apr. 13, 2017

(65) Prior Publication Data

US 2017/0302914 A1    Oct. 19, 2017

Related U.S. Application Data

(60) Provisional application No. 62/322,325, filed on Apr. 14, 2016.

(51) Int. Cl.
*H04N 7/18* (2006.01)
*H04N 13/327* (2018.01)
(Continued)

(52) U.S. Cl.
CPC .......... *H04N 13/327* (2018.05); *B60K 35/00* (2013.01); *B60R 1/00* (2013.01); *G06K 9/00335* (2013.01); *G06K 9/00604* (2013.01); *G06K 9/00671* (2013.01); *H04N 7/181* (2013.01); *H04N 13/243* (2018.05); *H04N 13/305* (2018.05);
(Continued)

(58) Field of Classification Search
CPC .. H04N 13/327; H04N 13/366; H04N 13/243; H04N 13/31; H04N 13/383; H04N 13/398; H04N 7/181; H04N 13/305; G06K 9/00604; G06K 9/00335; G06K 9/00671; G06F 3/048; B60K 2350/90; B60K 2350/2065; B60K 35/00;
(Continued)

(56) References Cited

U.S. PATENT DOCUMENTS 6,377,295 B1    4/2002    Woodgate et al.
6,501,536 B1    12/2002   Fredricks
(Continued)

FOREIGN PATENT DOCUMENTS

DE   102005001973 A1    7/2006
DE   102014205519 A1    10/2015
WO   2015168464 A1      11/2015

OTHER PUBLICATIONS

La Rota et al, Automatically adjustable rear mirror based on computer vision (Year: 2017).*
(Continued)

*Primary Examiner* — Shan E Elahi
(74) *Attorney, Agent, or Firm* — Price Heneveld LLP; Bradley D. Johnson

(57) ABSTRACT

The disclosure provides for a display system for a vehicle comprising at least one image sensor, an image processor, and a display. The image processor is in communication with the image sensor and configured to generate autostereoscopic image data. The display is in communication with the image processor and configured to display the autostereoscopic image data. The autostereoscopic image data is configured to provide a depth perception to assist in determining a proximity of an object in the image data.

19 Claims, 6 Drawing Sheets

(51) Int. Cl.
| | |
|---|---|
| *H04N 13/305* | (2018.01) |
| *H04N 13/383* | (2018.01) |
| *H04N 13/398* | (2018.01) |
| *B60K 35/00* | (2006.01) |
| *B60R 1/00* | (2006.01) |
| *G06K 9/00* | (2006.01) |
| *H04N 13/31* | (2018.01) |
| *H04N 13/243* | (2018.01) |
| *H04N 13/366* | (2018.01) |
| *G06F 3/048* | (2013.01) |

(52) U.S. Cl.
CPC ........... *H04N 13/31* (2018.05); *H04N 13/366* (2018.05); *H04N 13/383* (2018.05); *H04N 13/398* (2018.05); *B60K 2350/2013* (2013.01); *B60K 2350/2065* (2013.01); *B60K 2350/90* (2013.01); *B60R 2300/105* (2013.01); *B60R 2300/20* (2013.01); *B60R 2300/30* (2013.01); *G06F 3/048* (2013.01)

(58) Field of Classification Search
CPC ...... B60K 2350/2013; B60R 2300/105; B60R 2300/20; B60R 2300/30; B60R 1/00
USPC .......................................................... 348/48
See application file for complete search history.

(56) References Cited

U.S. PATENT DOCUMENTS

| | | | |
|---|---|---|---|
| 6,572,233 B1 | 6/2003 | Northman et al. | |
| 8,237,909 B2 | 8/2012 | Ostreko et al. | |
| 8,339,526 B2 | 12/2012 | Minikey, Jr. et al. | |
| 8,411,245 B2 | 4/2013 | Lee et al. | |
| 8,947,605 B2 | 2/2015 | Eichenlaub | |
| 9,179,134 B2 | 11/2015 | Ranieri et al. | |
| 9,179,140 B2* | 11/2015 | Shimotani | G01C 21/365 |
| 9,709,814 B2* | 7/2017 | Nagahara | G02B 27/22 |
| 2007/0008620 A1 | 1/2007 | Shestak et al. | |
| 2007/0018970 A1 | 1/2007 | Tabasso et al. | |
| 2007/0096445 A1* | 5/2007 | Breed | B60N 2/002 |
| | | | 280/735 |
| 2007/0272837 A1* | 11/2007 | Yoshifuku | B60R 21/01538 |
| | | | 250/226 |
| 2009/0282429 A1* | 11/2009 | Olsson | H04N 13/0477 |
| | | | 725/10 |
| 2010/0149317 A1 | 6/2010 | Matthews | |
| 2010/0182432 A1* | 7/2010 | Augst | B60R 1/00 |
| | | | 348/148 |
| 2010/0201816 A1 | 8/2010 | Lee et al. | |
| 2012/0147139 A1* | 6/2012 | Li | G03B 35/08 |
| | | | 348/43 |
| 2012/0229609 A1* | 9/2012 | Yamada | H04N 13/264 |
| | | | 348/46 |
| 2013/0076876 A1* | 3/2013 | Shimotani | G01C 21/365 |
| | | | 348/51 |
| 2013/0113786 A1 | 5/2013 | King | |
| 2013/0127608 A1 | 5/2013 | Ishikawa et al. | |
| 2013/0127861 A1* | 5/2013 | Gollier | H04N 17/04 |
| | | | 345/426 |
| 2013/0201303 A1* | 8/2013 | Shimotani | G01C 21/365 |
| | | | 348/51 |
| 2013/0342913 A1 | 12/2013 | Tsimhoni et al. | |
| 2014/0125783 A1 | 5/2014 | Chung et al. | |
| 2014/0309864 A1* | 10/2014 | Ricci | H04W 4/21 |
| | | | 701/36 |
| 2014/0320656 A1 | 10/2014 | Foley | |
| 2014/0327771 A1 | 11/2014 | Malachowsky et al. | |
| 2015/0319423 A1 | 11/2015 | Kim et al. | |
| 2015/0334379 A1 | 11/2015 | Du et al. | |
| 2016/0042501 A1 | 2/2016 | Huang et al. | |
| 2016/0318523 A1* | 11/2016 | Kim | B60W 30/18018 |

OTHER PUBLICATIONS

Helle et al, Autostereoscopic displays and computer graphics (Year: 1997).*

International Search Report and Written Opinion of the International Searching Authority, or the Declaration, dated Aug. 17, 2017, for International Application No. PCT/US2017/027437, filed Apr. 13, 2017, 9 pages.

Gotoda, "A Multilayer Display Augmented by Alternating Layers of Lenticular Sheets," Visual Communications and Image Processing, vol. 9011, Mar. 6, 2014 (8 pages).

Fu-Chung Huang et al., "Correcting for Optical Aberrations using Multilayer Displays," ACM Transactions on Graphics, vol. 31, No. 6, Nov. 1, 2012 (12 pages).

Pamplona, Vitor F. et al., "Tailored Displays to Compensate for Visual Aberrations," Siggraph, 2012, pp. 1-12.

* cited by examiner

VEHICLE DISPLAY SYSTEM PROVIDING DEPTH INFORMATION

CROSS REFERENCE TO RELATED APPLICATION

This application claims priority to and the benefit under 35 U.S.C. § 119(e) of U.S. Provisional Patent Application No. 62/322,325, filed on Apr. 14, 2016, entitled "VISION CORRECTING VEHICLE DISPLAY," the entire disclosure of which is hereby incorporated herein by reference.

TECHNOLOGICAL FIELD

The present invention generally relates to display devices for vehicles and more particularly to display devices configured to display image data providing depth information for a vehicular display.

SUMMARY OF THE DISCLOSURE

According to one aspect of the present disclosure, the disclosure provides for a display system for a vehicle comprising at least one image sensor, an image processor, and a display. The image processor is in communication with the image sensor and configured to generate autostereoscopic image data. The display is in communication with the image processor and configured to display the autostereoscopic image data. The autostereoscopic image data is configured to provide a depth perception to assist in determining a proximity of an object in the image data.

According to another aspect of the present disclosure, a vehicle display device is disclosed. The device comprises a plurality of image sensors configured to capture image data. The device further comprises a tracking sensor configured to identify a position of an occupant and an image processor. The image processor is in communication with the image sensors and the tracking sensor. The image processor is configured to generate stereoscopic image data from the image data. The stereoscopic image data comprises right image data and left image data. The device further comprises a display apparatus in communication with the image processor. The display apparatus comprising an optical array is configured to communicate the stereoscopic image data independently to each of a right eye and a left eye of the occupant based on the position of the occupant.

According to yet another aspect of the present disclosure, a vehicle display device is disclosed. The display device comprises a plurality of image sensors configured to capture image data, a tracking sensor configured to identify a position of an occupant, and an image processor in communication with the image sensors and the tracking sensor. The image processor is configured to generate stereoscopic image data from the image data. The stereoscopic image data comprises right image data and left image data. The device further comprises a display apparatus in communication with the image processor. The display apparatus comprises a pixel array comprising a plurality of pixels and a lenticular lens. The display apparatus is configured to activate a first portion of the plurality of pixels directing the right image data to a right eye of the occupant through the lenticular lens and activate a second portion of the plurality of pixels directing the left image data to a left eye of the occupant through the lenticular lens.

These and other features, advantages, and objects of the present invention will be further understood and appreciated by those skilled in the art by reference to the following specification, claims, and appended drawings.

DETAILED DESCRIPTION

Figure 1:
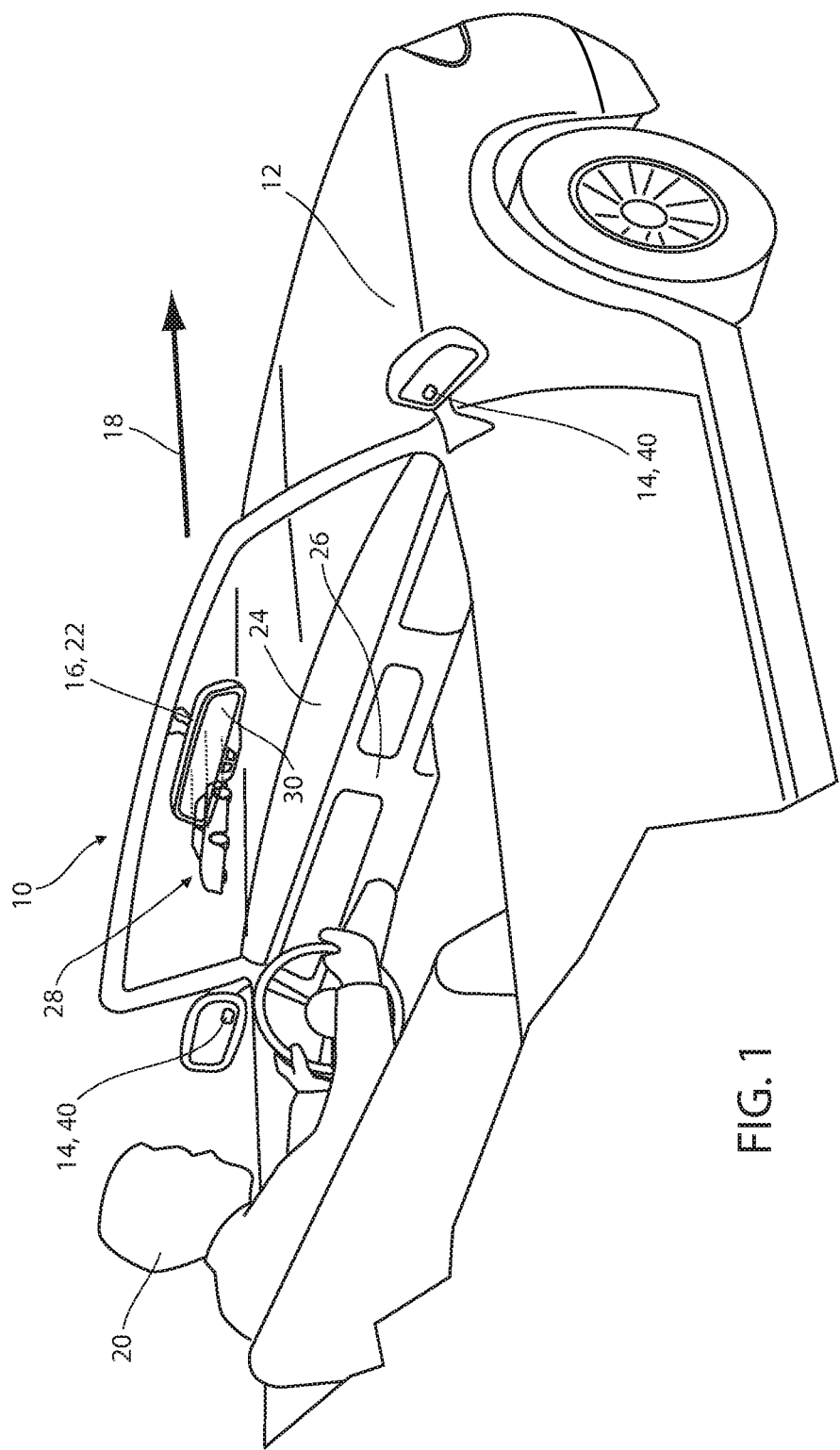
FIG. 1 is a projected view demonstrating a display system of a vehicle.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of a display, and the term "rear" shall refer to the surface of the element further from the intended viewer of the display. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
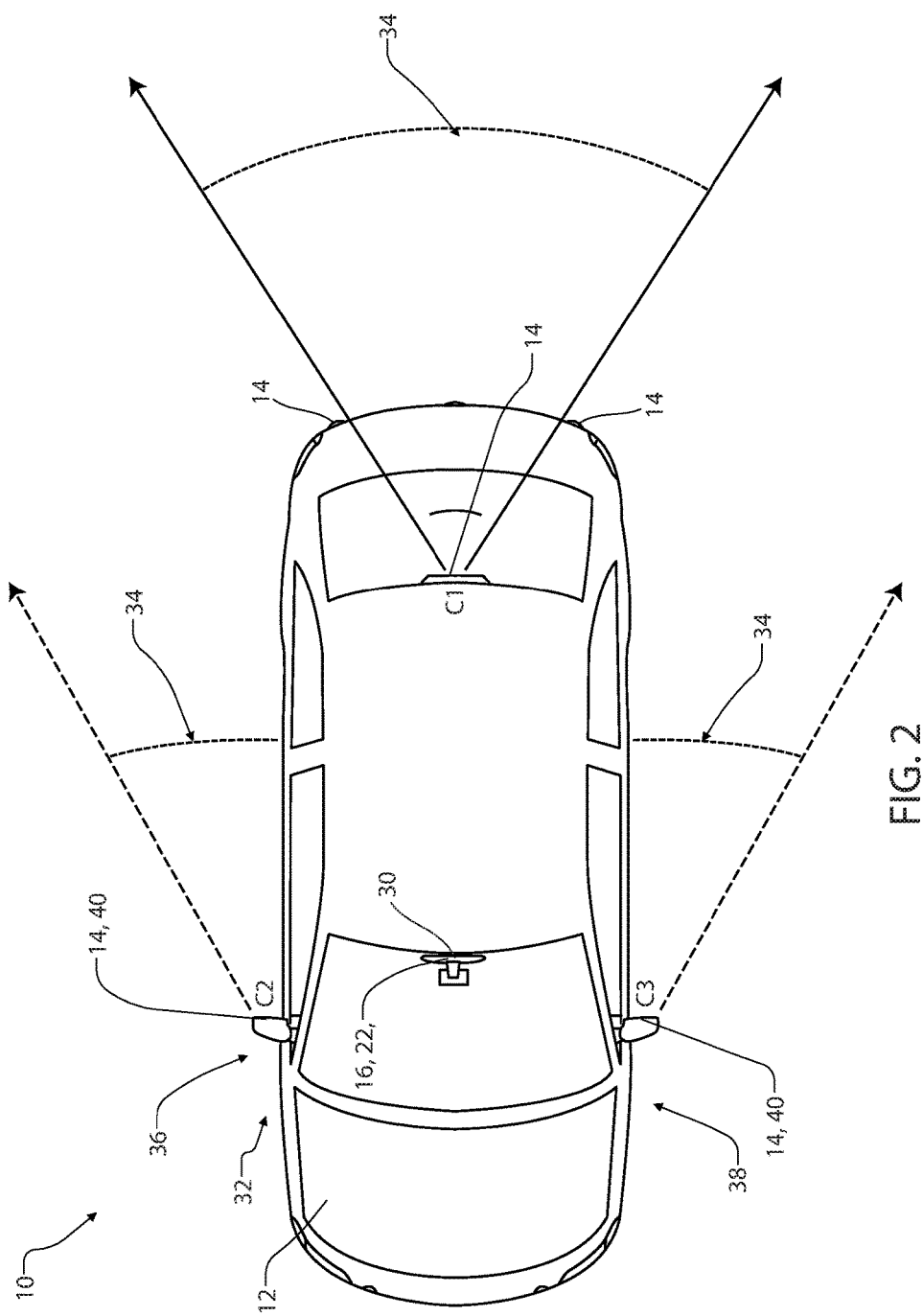
FIG. 2 is an elevational view of a vehicle demonstrating an imaging apparatus of a vehicle.

Referring to FIGS. 1 and 2, the disclosure provides for a display system 10 for a vehicle 12. The display system 10 may be operable to display image data providing a perception of three-dimensional content. The display system 10 may be configured to function as an autostereoscopic display, an a auto-multiscopic display, or a variety of other displays configured to provide image data perceived to have depth. The display system 10 may be configured to generate separate images for a right eye and a left eye of a viewer. Additionally, the display system 10 may be configured to generate a plurality of views that may be associated with a plurality of image sensors 14.

Embodiments of the display system 10 configured to provide for a plurality of views may utilize one or more automultiscopic projection methods to display image data. Such embodiments may be configured to display multiple views corresponding to a plurality of viewing angles of a particular scene. For example, each of the multiple views may correspond to views captured by the plurality of image sensors 14 based on the relative location of the image sensors 14 on the vehicle 12. In this configuration, a display screen 16 or a rearview display may provide for views that may normally be shown on a rearview mirror and conventional side mirrors. The views demonstrated on the display screen 16 may vary based on an angle of the display screen 16 relative to a forward 18 operating direction of the vehicle 12.

In some embodiments, the display system 10 may be configured to track the position of the occupant 20 in a passenger compartment of the vehicle 12. For example, the display system 10 may comprise one or more tracking sensors configured to track a location of a face and/or the eyes of the occupant 20. The one or more tracking sensors may be incorporated in a display assembly 22 of the display system 10. In this way, the display system 10 may be operable to track a position of the eyes of the occupant 20 to control specific pixels in a pixel array to direct image data to the left eye or the right eye of the occupant 20. As discussed herein, the disclosure provides for various embodiments of vehicular displays that may be operable to provide an illusion of depth or three-dimensional content to enhance the information that may be demonstrated on the display screen 16. Further detailed description of the tracking sensor 80 is discussed in reference to FIGS. 4 and 6.

In various embodiments, the display system 10 may utilize parallax-based displays and/or integral imaging (lenticular sheets or fish-eye arrays). Such display technologies may be used to provide an autostereoscopic or automultiscopic experience for the occupant 20 or a view of the display screen 16. Parallax-based displays may incorporate a parallax barrier and/or employ horizontally modulated blocking patterns to communicate different frames of image data to the right eye and the left of the occupant 20. In this way, the display screen 16 of the display assembly 22 may be configured to project specific image data at different viewing angles such that the image data is specifically directed to the right eye separately from the left eye.

In general, the parallax barrier is a device that may be placed in front of the display screen 16, such as a liquid crystal display (LCD) or other displays, to allow the display screen 16 to show or display a stereoscopic or 3D image without the need for the viewer to wear 3D glasses. The parallax barrier may include a layer of material with a series of precision slits or lenses that allow the display system 10 to direct a different set of pixels to each eye of the occupant 20. The pixels delivered to each eye are configured to simulate a sense of depth through the parallax. Similarly, the display system 10 may also or alternatively utilize volumetric displays to provide images of 3D objects with correct focus and depth cues by creating a volume of individually controlled light sources.

In some embodiments, the display system 10 may be configured to generate virtual three-dimensional data derived from image data received from the image sensors 14. In this way, the display system 10 provides for a flexible system configured to display image data providing depth information. Virtual information may correspond to computer generated graphics that may be generated by one or more processors, microprocessors, graphical processing units (GPUs), etc., which may be in communication with and/or incorporated in the image processor and/or the display system 10. The image processor is discussed further in reference to FIG. 6.

In an exemplary embodiment, the display screen 16 of the display system 10 may be incorporated in an interior rearview assembly to form the display assembly 22. The display assembly 22 may be mounted or otherwise attached to a vehicle 12 in a variety of locations. For example, the display assembly 22 may be integrated into a gauge cluster, the dashboard 24, the center stack 26 (e.g., an infotainment center), or a headliner of the vehicle 12. The display assembly 22 may be located in other peripheral locations. For example, the display assembly 22 may be mounted to a visor. The display assembly 22 may also be mounted to other surfaces of a vehicle 12 (e.g., windshield, door panel, or other vehicle components).

As illustrated in FIG. 1, an image processor of the display system 10 may be configured to generate three-dimensional image data 28 configured to provide an illusion of a relative depth for image data representing a rearward directed view relative to the forward direction 18 of the vehicle 12. In other words, the display screen 16 may be operable to generate the three-dimensional image data 28 to display rearview image data that may typically be shown on a rearview mirror. The rearview image data may be displayed with enhanced depth information that may appear to protrude from a front surface 30 of the display screen 16. By providing the depth information as the three-dimensional image data 28, the display screen 16 may provide the occupant 20 of the vehicle 12 with an improved estimate of a proximity or range of an object relative to the vehicle 12. In some embodiments, the display system 10 may further provide for a plurality of views or fields of view to be displayed on the display screen 16.

Figure 3:
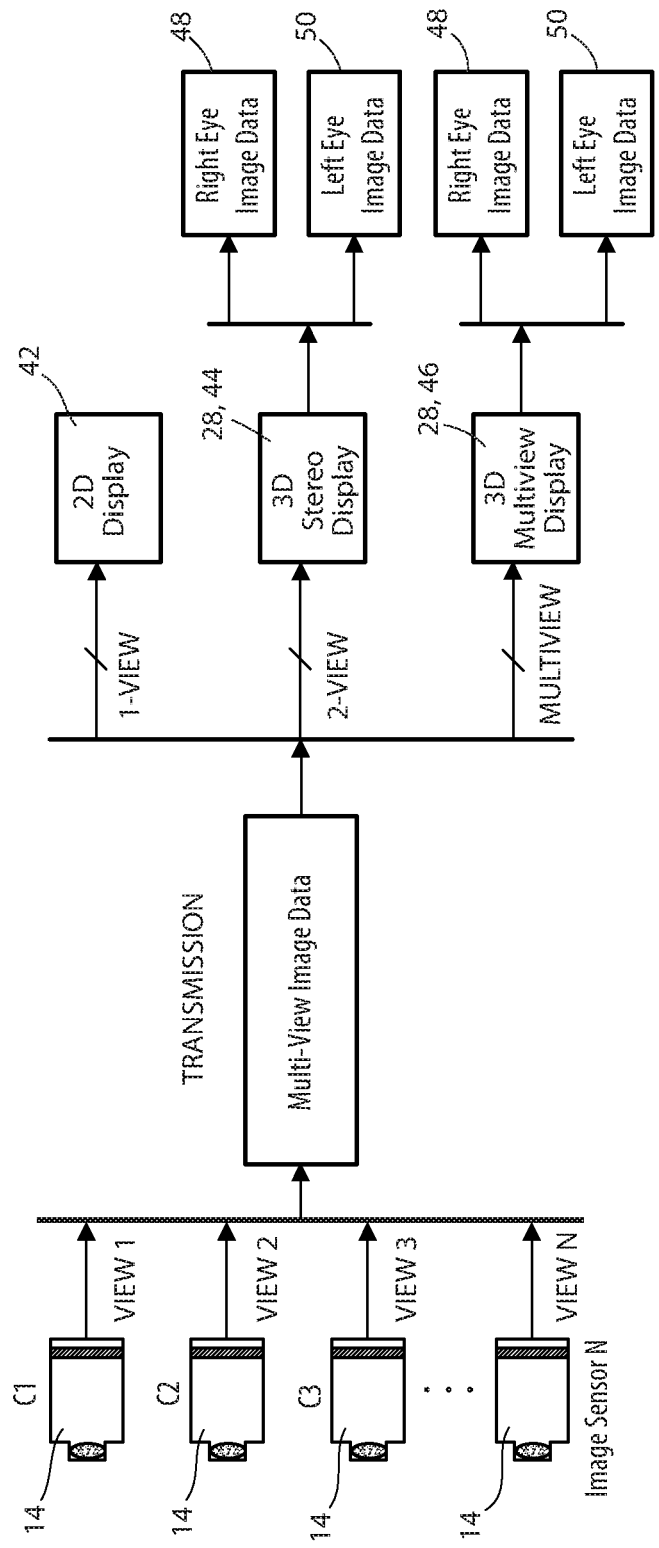
FIG. 3 is a block diagram of an image processing method for generating three-dimensional image data.
Figure 4:
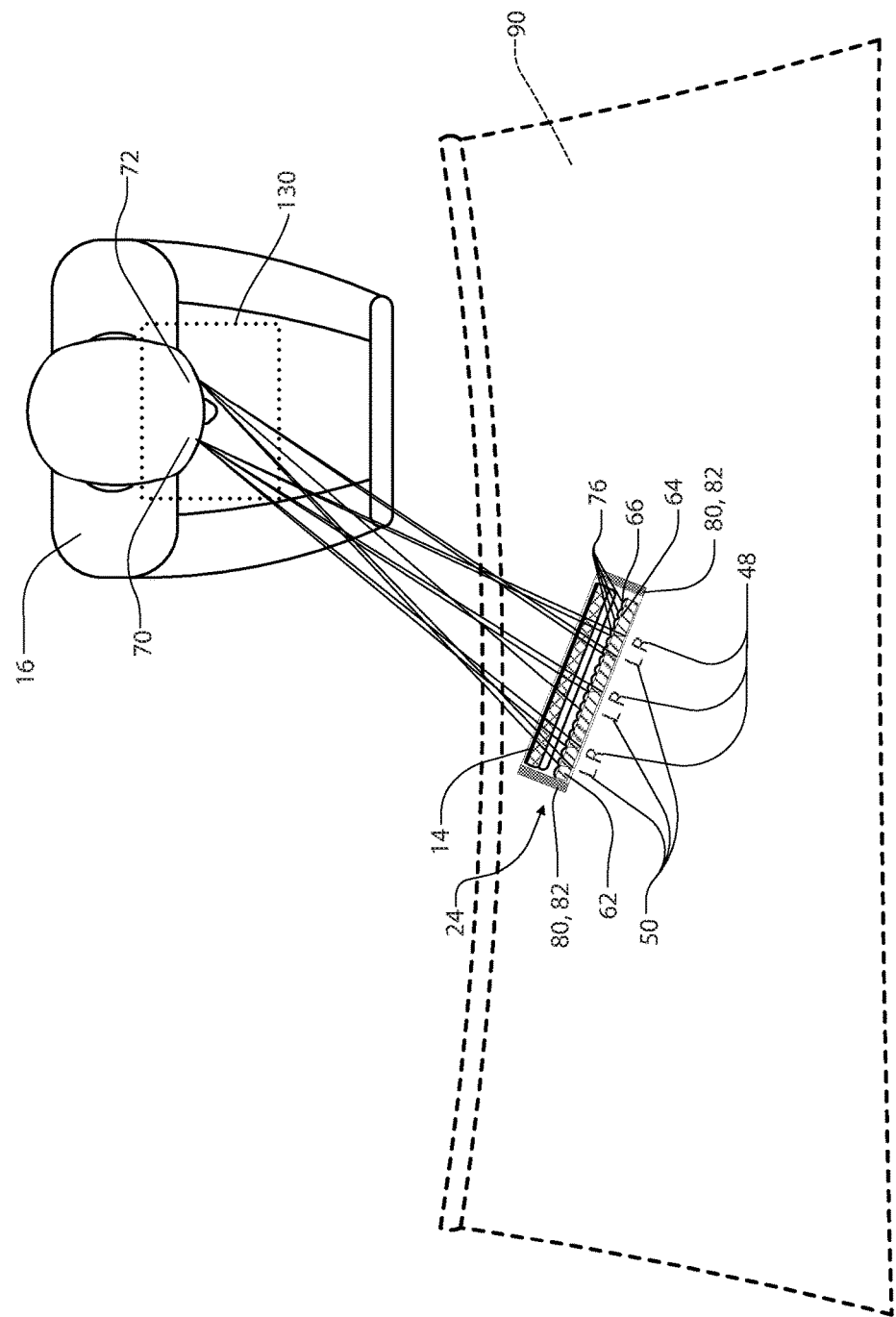
FIG. 4 is a top schematic view of a vehicle occupant viewing image data comprising depth information.

As discussed further in reference to FIGS. 3 and 4, the display system 10 may be configured to capture and display image data on the display screen 16. The image data may comprise image data in the form of right eye image data or image frames and left eye image data or image frames. The right eye image data 48 may be transmitted from the display screen 16 such that it is received by the right eye of the occupant 20. The left eye image data 50 may be transmitted from the display screen 16 such that it is received by the left eye of the occupant 20. Accordingly, the display screen 16 may form a portion of a display apparatus or the display assembly 22 configured to project specific image data to each of the left eye and the right eye of the occupant 20.

According to various embodiments, the display system 10 may comprise similar features to an autostereoscopic or automultiscopic display. The following references may include various implementations for display systems and camera systems configured to provide for autostereoscopic and/or automultiscopic functionality and are incorporated herein by reference in their entirety: U.S. Pat. No. 9,179,134 B2, entitled "MULTI-LAYER PLENOPTIC DISPLAYS THAT COMBINE MULTIPLE EMISSIVE AND LIGHT MODULATING PLANES, filed Nov. 27, 2012, by Ranieri et al.; U.S. Publication No. 2015/0334379 A1, entitled "DISPLAY UNIT FOR ROTATABLY DISPLAYING AN AUTOSTEREOSCOPIC PRESENTATION," filed Dec. 24, 2012, by Lin Du et al; U.S. Pat. No. 6,377,295 B1, entitled "OBSERVER TRACKING DIRECTIONAL DISPLAY," filed Apr. 23, 2002, by Graham Woodgate, et al.; U.S. Pat. No. 9,843,776, entitled "MULTI-PERSPECTIVE STEREOSCOPY FROM LIGHT FIELDS," filed Jul. 15, 2015 by Changil Kim et al.; U.S. Pat. No. 10,025,110, entitled "AUTOSTEREOSCOPIC IMAGE DISPLAY AND METHOD FOR DRIVING THE SAME," filed Nov. 6, 2013 by Bogyun Chung et al.; U.S. Pat. No. 8,947,605 B2, entitled "IMAGE DATA PLACEMENT METHOD FOR A TIME MULTIPLEXED AUTOSTEREOSCOPIC DISPLAY," filed Sep. 13, 2012 by Jesse B. Eichenlaub; and U.S. Publication No. 2009/0282429 A1, entitled "VIEWER TRACKING FOR DISPLAYING THREE DIMENSIONAL VIEWS," filed May 7, 2008 by Stefan Olsson, et al.

As discussed herein, the display system 10 may be configured to generate separate images for the right eye and the left eye of the occupant 20. Additionally, the display system 10 may be configured to generate a plurality of views that may be associated with a plurality of image sensors (e.g., the image sensors 14). Embodiments of the display system 10 configured to provide for a plurality of views may utilize one or more stereoscopic display methods to communicate the image data to the left eye and the right eye independently. In this configuration, the display system 10 may provide for views that may normally be shown on a rearview mirror and conventional side mirrors including the three-dimensional image data 28.

Referring now to FIG. 2, a diagram of an imaging apparatus 32 of the vehicle 12 is shown. In an exemplary embodiment, the at least one image sensor 14 may be utilized in combination as a plurality of image sensors 14 forming an imaging apparatus 32 or stereoscopic imaging apparatus. The imaging apparatus 32 may correspond to a first image sensor C1, a second image sensor C2, and a third image sensor C3. Each of the image sensors 14 may have a field of view 34 focusing on an environment proximate the vehicle 12. In the various implementations discussed herein, the image sensors C1-C3 may be implemented to provide views of the environment proximate the vehicle 12 that may be displayed on the display screen 16 or any form of display device.

The image sensors 14 may be arranged in various locations on the vehicle 12. In an exemplary embodiment, the image sensors 14 may be arranged such that each of a plurality of fields of view 34 of the image sensors C1-C3 is configured to capture a significantly different portion of the surrounding environment. Each of the image sensors 14 may comprise any form of device configured to capture image data; for example, Charge Coupled Device (CCD) and Complementary Metal Oxide Semiconductor (CMOS) image sensors. Though three image sensors C1, C2, and C3 are discussed in reference to the present implementation, the number of image sensors may vary based on the specifications of the particular image sensors and/or a desired number of fields of view 34 for the display system 10.

The image sensors C1, C2, and C3 are disposed on the vehicle 12 and oriented such that each field of view 34 of the image sensors 14 is directed toward a substantially different region. A first image sensor C1 may be disposed centrally on a rear facing portion of the vehicle 12 proximate a rear windshield, rear decklid, or similar area of the vehicle 12. In some embodiments, the image sensor C1 may be disposed proximate a rear-bumper and/or a center high mount stop light (CHMSL). A second image sensor C2 and a third image sensor C3 may be disposed on a passenger's side 36 and a driver's side 38 of the vehicle 12, respectively. The second image sensor C2 and the third image sensor C3 may be configured to capture image data corresponding to the environment proximate the side regions of the vehicle 12.

In some implementations, the second image sensor C2 and the third image sensor C3 may be disposed in side mirrors 40 of the vehicle 12. The image sensors C2 and C3, in combination with the first image sensor C1, may be configured to capture image data corresponding to a rearward-directed region relative the forward direction of the vehicle 12. In some embodiments, the image sensors 14 may be configured to capture an increased or decreased viewing angle depending on the particular application. In some embodiments, the image sensors may be configured to capture approximately the entire environment surrounding the vehicle 12.

Figure 5:
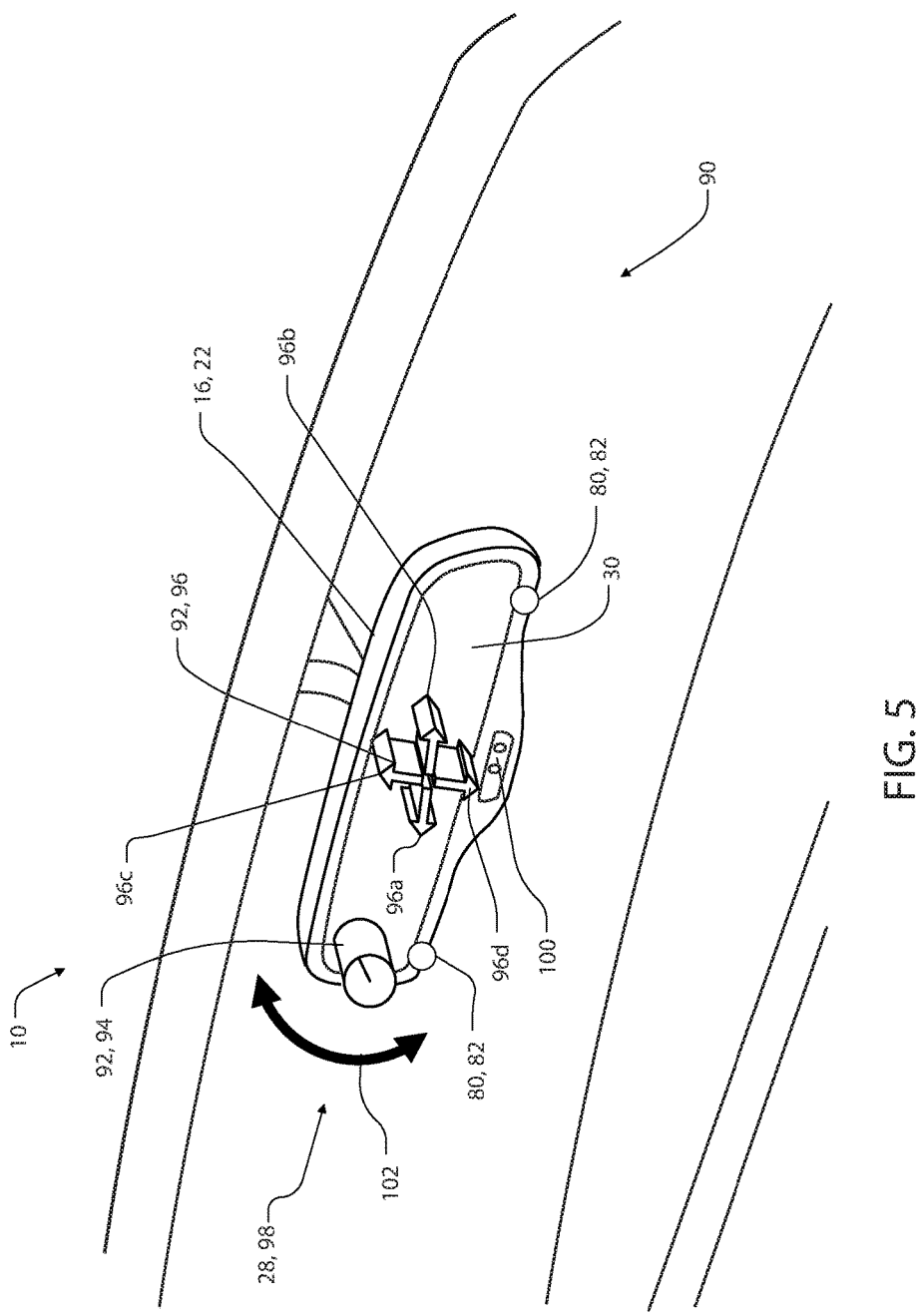
FIG. 5 is a schematic diagram demonstrating graphical information displayed on a display system providing for three-dimensional effects.

As discussed further in reference to FIGS. 3 and 5, the image sensors 14 may be in communication with the image processor configured to process image data from each of the fields of view 34 captured by the image sensors 14. The image processor may be configured to generate sequences of image data from the fields of view 34 that provide an illusion of three dimensional (3D) image data protruding from the front surface 30 of the display screen 16. In this configuration, the display system 10 may provide for an enhanced viewing experience that may improve a depth perception of a viewer of the display system 10. Though discussed in detail in reference to the interior rearview assembly, the display system may be utilized in various portions of the vehicle (e.g., a vehicle console, gage cluster, etc.). As such, the disclosure provides for various embodiments of vehicle displays that may be utilized for a variety of applications.

Referring now to FIG. 3, a block diagram of an image processing process that may be completed by the image processor is shown. The image processor may receive image data from each of the image sensors C1, C2, and C3 and encode or process the image data for demonstration on the display screen 16. For example, the first image sensor C1 may provide for a first view (VIEW 1), the second image sensor C2 may provide for a second view (VIEW 2), and the third image sensor C3 may provide for a third view (VIEW 3). The image data corresponding to each of the views may be processed and transmitted to the display assembly 22.

As discussed previously, the plurality of image sensors 14 may correspond to various numbers of image sensors (e.g., image sensor N) configured to capture various numbers of views (view N). Accordingly, the image processor may be configured to process the image data from each of the image sensors associated with the display system 10. In some embodiments, the display system may use one or more image sensors 14 to generate three dimensional image data. In embodiments that utilize only a single image sensor, virtual depth information derived from the image data may be utilized to provide for display of the three-dimensional image data 28.

The image data received from the image processor may be displayed on the display screen 16 as a two-dimensional (2D) display 42. Additionally, the display system 10 may be configured to provide for a 3D stereoscopic display 44 having two views selected and used to display a 3D image on the 3D stereo display. The display system 10 may also be configured to provide for a 3D multiview display 46, utilizing at least two views selected and used to display a 3D multiview image. The 3D multiview display 46 may select a plurality of views from the image sensors 14. The views selected may be identified by the system based on an angle of the display screen 16 relative to a forward direction 18 of the vehicle 12. The views demonstrated on the display screen 16 may also or alternatively vary based on a relative position of an occupant 20 of the vehicle 12 relative to the display screen 16.

In some embodiments, the three-dimensional image data 28 generated for the 3D stereoscopic display 44 or the 3D multiview display 46 may be processed and directed through a lens or optical array to deliver right eye image data 48 to a right eye of the occupant 20 and left eye image data 50 to a left eye of the operator. In this way, the display system 10 may provide for the three-dimensional image data 28 to provide a perception of depth to the image data displayed on the display screen 16. In order to deliver the right eye image data 48 and the left eye image data 50 to each of the eyes of the occupant 20, the display system 10 may be configured to align the image data 48, 50 with light-field rays of an optical array or lens such that the image data is delivered independently to the retinal positions of the right eye and the left eye of the occupant 20. In this way, specific image data may be delivered independently to the right eye and the left eye of the occupant 20 or operator.

Referring now to FIG. 4, the display system 10 is shown in reference to a windshield 90 of the vehicle 12. To provide for the display of the 3D image data 28, the system 10 may comprise a display panel 62 corresponding to a pixel array 64 and a lenticular lens 66 formed on the display panel 62. A rear surface of the display screen 16 directed toward the occupant 20 may face the lenticular lens 66. The display panel 62 may correspond to a variety of display types having the pixel array 64, which may be arranged in rows and columns. For example, the display panel 62 may correspond to a liquid crystal display (LCD), a plasma display, an organic light emitting diode (OLED) display, a field emission display (FED) panel, or various other displays.

In order to provide for independent delivery of the right eye image data 48 and the left eye image data 50 to the right eye 70 and the left eye 72 of the occupant 20, the display system 10 may be configured to selectively activate specific pixels of the pixel array 64 to communicate the right eye image data 48 (R) to the right eye 70 and left eye image data 50 (L) to the left eye 72. The lenticular lens 66 may comprise long cylindrical lens elements 76. The lens elements 76 may be arranged in parallel and be aligned with the columns of the pixel array 64. Accordingly, the lenticular lens 66 may be disposed over the display panel 62. The lenticular lens 66 may separate the right eye image data 48 from the left eye image data 50 based on a location of each pixel relative to the cylindrical elements 76. In this way, the display assembly 22 may be configured to direct the right eye image data 48 to the right eye 70 and the left eye image data 50 to the left eye 72.

As discussed herein, the display system 10 may be operable to receive image data corresponding to one or more images of a scene proximate the vehicle 12. The system 10 may apply one or more algorithms or image processing techniques to produce right eye image data 48 and the left eye image data 50. The system 10 may comprise at least one tracking sensor 80 configured to identify a positon of the occupant 20 and more specifically may identify a position of the right eye 70 and the left eye 72. Once the position of each eye 70 and 72 of the occupant 20 is determined, the system 10 may determine specific pixels pf the pixel array 64 aligned with the lens elements 76 of the lenticular lens 66 and each of the eyes 70 and 72. The system 10 may then activate the pixels aligned with the right eye 70 to project the right eye image data 48 and activate the pixels aligned with the left eye 72 to project the left eye image data 50. In this way, the system 10 may project the 3D image data 28 independently to the right eye 70 and the left eye 72 of the occupant 20.

The tracking sensor 80 may be implemented as an ultrasound sensor, an infrared sensor, a camera sensor/imager, a heat detector, etc. In general, the tracking sensor 80 may identify a position of the occupant 20 to generate views of image data from the image sensors 14. In some embodiments, the at least one tracking sensor 80 may correspond to a plurality of image sensors 82 configured to identify a position of the occupant 20 and more specifically a location of the right eye 70 and the left eye 72 in three-dimensional space within the vehicle 12 via a stereoscopic positioning algorithm. Accordingly, the system 10 may communicate the generated or selected views to provide the occupant 20 or viewer with a perception of depth. The selected views may provide for the image data displayed on the display screen 16 to appear as though it is reflected from the front surface 30 similar to a conventional rearview mirror reflection.

Referring now to FIG. 5, the display assembly 22 is shown in reference to the windshield 90 of the vehicle 12. As discussed herein, the display system 10 may be operable to receive image data corresponding to one or more images of a scene proximate the vehicle 12. The system 10 may apply one or more algorithms or image-processing techniques to produce stereoscopic image data configured to provide a perception of three-dimensional depth to the occupant 20. The occupant 20 of the vehicle 12 may view three-dimensional image data 28 independently in each of the right eye 70 and the left eye 72 as the right eye image data 48 and the left eye image data 50. As a result, the right eye image data 48 and left eye image data 50 displayed on the display screen 16 may appear to the occupant 20 as though one or more features of the three-dimensional image data 28 extend outward from or are approaching from behind the display screen 16. In this way, the disclosure provides for a system configured to provide valuable depth information to the occupant 20 (e.g., the operator).

In some embodiments, the disclosure further provides for the display system 10 to generate and display graphical information 92 to be displayed on the display screen 16. The graphical information 92 may also be generated via an autostereoscopic display method such that the graphical information 92 may appear to protrude from the front surface 30 of the display assembly 22. The graphical information 92 may correspond to any shape or image that may be generated by the display system 10. As illustrated, the graphical information 92 corresponds to a dial 94 and a directional pad 96. In this configuration, the graphical information 92 may provide for a virtual user interface 98 to be displayed on the display screen 16. The virtual user interface 98 may provide for the graphical information 92 to be displayed having a three-dimensional effect produced by one or more autostereoscopic and/or automultiscopic display methods.

The display assembly 22 may also comprise an input sensor 100. The input sensor 100 may be configured to detect and identify motion or gestures proximate the display screen 16. For example, the input sensor 100 may be configured to detect a rotational motion 102 corresponding to a digit or hand of a user attempting to turn the dial 94. Additionally, the input sensor 100 may be configured to detect a digit or hand of a user attempting to press a left direction 96*a*, a right direction 96*b*, an up direction 96*c*, and/or a down direction 96*d* of the directional pad 96. The input sensor 100 may be operable to detect various gestures or motions that may be sensed proximate to one or more of images, shapes, or data provided by the graphical information 92. Some examples of gestures may include a turning motion, a waving motion, a pinching, expanding, inward (approaching), outward (withdrawing), and various other movements or combinations thereof. In an exemplary embodiment, the movements or gestures detected by the input sensor 100 may correspond to a function of suggested interaction of one or more objects displayed in the graphical information 92. In this way, the display system may provide for virtual controls to be displayed on the display screen 16 and interacted with by an occupant of the vehicle 12.

The input sensor 100 may correspond to a proximity sensor. A variety of proximity sensors may be utilized as the input sensor 100. In various embodiments, the input sensor 100 may work by emitting an electromagnetic field, an electrostatic field, or a beam of electromagnetic radiation (infrared, for instance), and detecting changes in the field or return signal. The types of suitable sensors available include, but are not limited to, inductive, capacitive, capacitive displacement, eddy-current, magnetic, electromagnetic, photocell, laser range-finding, sonar, radar, Doppler effect, passive thermal infrared, passive optical, ionizing radiation reflective sensors, reed switch, Hall effect, resistive variation, conductive variation, echo (e.g., sound be it ultrasonic or radar), optical pattern recognition technologies and micro air flux change (detections of air current variations between sensors as opposed to macro flux changes).

Optical sensing using, for example, infrared proximity sensing, involves using an optical sensing circuit to pulse light, e.g., infrared light, emitted from an emitter which, should an object such as a user's finger be present in front of or above the emitter (e.g., a laser diode or LED), reflects off of the user's finger and back toward an infrared detector (e.g., a photodiode, a type of photodetector capable of converting light into either current or voltage, depending upon the mode of operation), generally adjacent or concentric with the emitter and configured to detect changes in light intensity. If reflected infrared light is detected, it is assumed that an object is present, proximate the infrared emitter. If not, then it is assumed no object is present. When a threshold of light is detected that corresponds to touch, at distance of 0 mm, then touch is indicated and whatever action that is to be executed upon touch is initiated. In such a case, the touch parameter is a parameter of sufficient proximity, which is typically contact, at which proximity a touch signal indicating touch is sent to a processor of the system 10, thereby allowing traditional keypad use with the benefits of touch pad use. As an example of a suitable infrared proximity sensor, Avago Technology's proximity sensors are reflective, non-contact sensors in a small form factor SMT package that offer detection ranges from near zero to 60 mm with analogue-output. Suitable for use in mobile applications and industrial control systems, their model APDS-9101 is a low cost, integrated reflective sensor incorporating infrared LED and a phototransistor designed to provide object detection and non-contact proximity sensing in the detection range of near 0 mm to 12 mm. The proximity sensors described in U.S. patent application Publication No. 2007/0018970 A1, entitled OPTICAL SLIDER FOR INPUT DEVICES, the content of which is incorporated by reference hereto, available from Logitech, Inc. of Fremont, Calif., are also suitable for this purpose.

Capacitive proximity sensing may measure an advantage change in capacitance over a sensor when a target is and is not present within a sensing range. If a change in capacitance from a nominal or initial state is detected, then it is assumed that a target is present. A suitable capacitive proximity sensor system for use in some embodiments is available from Freescale Semiconductor, Inc. of Austin, Tex. Freescale's proximity controller model MPR08X controls multiple proximity sensors thereby allowing control of several different applications from one sensor. By multiplexing the electrodes, a single sensor is able to detect at multiple points. For example, proximity capacitive-touch sensors manage multiple configurations of touch pads, sliders, rotary positions and mechanical keys for user interfaces.

Still further, the system 10 may capture image data with the tracking sensor 80 (e.g., the image sensors 82) to recognize one or more gestures of objects identified in the image data. In this way, the image data from tracking sensor 80 may be used to detect gestures that may correspond to user inputs to the system 10 recognized by one or more pattern recognition technologies. For example, proximity detection and/or neural network technology may identify a pattern of an object and classify the object as a hand, finger, stylus, pointer, or an anomaly, for each sensor. Based on the identification, a gesture may be identified to control the system 10.

Figure 6:
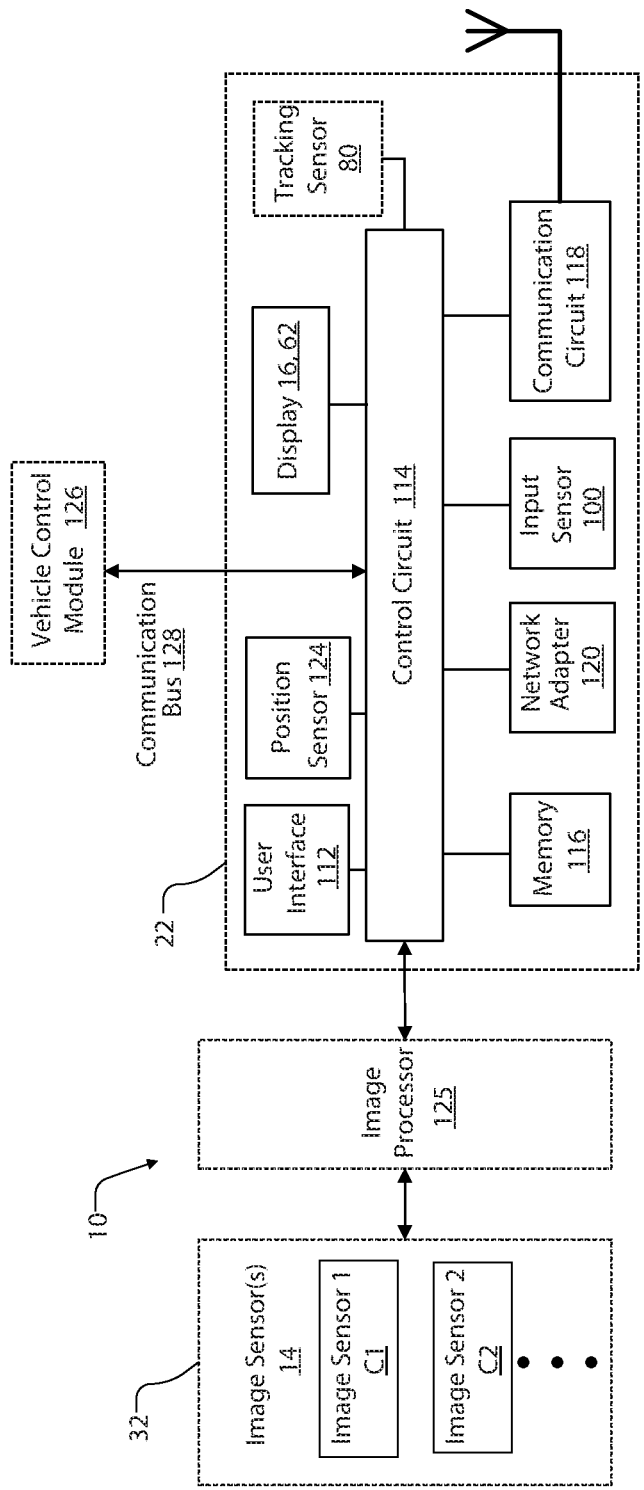
FIG. 6 is a block diagram of a display system in accordance with the disclosure.

Referring now to FIG. 6, a block diagram of the display system 10 is shown. The display system 10 may include a user interface 112 in the form of one or more buttons in communication with a control circuit 114. An exemplary embodiment of the display assembly 22 may incorporate the elements shown in the dashed line box. In some embodiments, the user interface 112 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action.

The display system 10 may comprise the display assembly 22 or a display apparatus. The display assembly 22 may comprise the display screen 16 or display panel 62 comprising the pixel array 64 and the lenticular lens 66. The lenticular lens 66 may be disposed between the front surface 30 of the display screen 16 and the occupant 20. The display panel 62 may comprise a variety of display types having the pixel array 64, which may be arranged in rows and columns. For example, the display panel 62 may correspond to a liquid crystal display (LCD), a plasma display, an organic light emitting diode (OLED) display, a field emission display (FED) panel, or various other displays. The display assembly 22 may further incorporate a speaker, haptic feedback device (e.g., vibration motor), LEDs, or other hardware components for providing an output.

The control circuit 114 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 114 may be a system on a chip (SoC) individually or with additional hardware components described herein. The control circuit 114 may further include memory 116 (e.g., random access memory, read only memory, flash memory, hard disk storage, flash memory storage, solid-state drive memory, etc.). In further embodiments, the control circuit 114 may function as a controller for one or more hardware components included in the display system 10. For example, the control circuit 114 may function as a controller for a touchscreen display or other operator input device, a controller for a transceiver, transmitter, receiver, or other communication device (e.g., implement a Bluetooth communications protocol).

In some embodiments, the control circuit 114 may be configured to receive inputs from the user interface 112. The inputs may be converted into control signals that may be identified and utilized to output one or more control signals and/or transmit data. In this configuration, the display system 10 may communicate (e.g., send and/or receive signals and/or data) to control various functions of the display or settings or functions of the vehicle 12.

The memory 116 may be used to facilitate the functions of the display system 10 as described herein. Memory 116 may include computer code modules, data, computer instructions, or other information which may be executed by the control circuit 114 or otherwise facilitate the functions of the display system 10 described herein. For example, memory 116 may include encryption codes, pairing information, identification information, a device registry configurations, image augmentation information, etc. The memory 116 and/or the control circuit 114 may facilitate the functions described herein using one or more programming techniques, data manipulation techniques, and/or processing techniques, such as using algorithms, routines, lookup tables, arrays, searching, databases, comparisons, instructions, etc.

The display system 10 may further comprise a communication circuit 118. The communication circuit 118 may correspond to a transceiver circuit or transmitter circuit coupled to the control circuit 114. The transceiver circuit may provide for the display system 10 to transmit and/or receive wireless communication signals. The wireless communication signals may be transmitted to or received from a variety of wireless devices (e.g., an original transmitter, home electronic device, mobile communications device, and/or remote device). The communication circuit 118 may be controlled by the control circuit 114. For example, the control circuit 114 may turn on or off the communication circuit 118, the control circuit 114 may send data using the communication circuit 118, format information, an activation signal, control signal, and/or other signal or data for transmission via the communication circuit 118, or otherwise control the communication circuit 118. Inputs from the communication circuit 118 may also be received by the control circuit 114.

In some embodiments, the communication circuit 118 may include additional hardware such as processors, memory, integrated circuits, antennas, etc. The communication circuit 118 may process information prior to transmission or upon reception and prior to passing the information to the control circuit 114. In some embodiments, the communication circuit 118 may be coupled directly to memory 116 (e.g., to store encryption data, retrieve encryption data, etc.). In further embodiments, the communication circuit 118 may include one or more transceivers, transmitters, receivers, etc. For example, the communication circuit 118 may include an optical transceiver, near field communication (NFC) transceiver, etc. In some embodiments, the communication circuit 118 may be implemented as a SoC.

The control circuit 114 may be also coupled to a network adapter 120, receivers, and/or transmitters. In some embodiments, the network adapter 120 may be configured to communicate with the image sensors 14. In some embodiments, the network adapter 120 may be or include a cellular transceiver. In this configuration, the display system 10 may use the network adapter 120 and/or an additional transceiver (e.g., a cellular transceiver) to access the internet, other networks, and/or network hardware. In some embodiments, the display system 10 may access the internet, other networks, and/or network hardware through an intermediate device in communication with the display system 10 such as a mobile device.

In an exemplary embodiment, the network adapter 120 may be configured to send/receive data and/or control signals to a mobile device. The network adapter 120 may communicate via various wireless communication protocols. For example, communication protocols may include, but are not limited to, Bluetooth™ (e.g., a Bluetooth low energy (BLE), WiFi (IEEE 802.11), Zigbee, cellular, etc.), a wired interface and/or protocol (e.g., Ethernet, universal serial bus (USB), Firewire, etc.), or other communications connection (e.g., infrared, optical, ultrasound, etc.).

In some embodiments, the display system 10 may track a position of the occupant 20 or a viewer (e.g., a position of the eyes 70 and 72 of the occupant 20) with the tracking sensor 80. The tracking sensor 80 may be implemented as an ultrasound sensor, an infrared sensor, a camera sensor/imager, a heat detector, etc. In general, the tracking sensor 80 may identify a position of the occupant 20 to generate views of image data from the image sensors 14. The generated or selected views may correspond to views that may provide the occupant 20 or viewer with a perception of depth. The selected views may provide for the image data displayed on the display screen 16 to appear as though the image data comprises a three-dimensional depth behind the front surface 30 similar to a conventional rearview mirror reflection.

In some embodiments, the display system 10 may comprise a position sensor 124 configured to identify a position or orientation of the display assembly 22 relative to a forward direction 18 of the vehicle 12. The position sensor 124 may correspond to an electrical or electromechanical sensor (e.g., an encoder, potentiometer, proximity sensor, compass, gyroscope, etc.), and may be configured to identify an angle of the display assembly 22 or the display screen 16 relative to the forward direction 18 of the vehicle 12. In this way, the image processor 125 may be operable to process the image data to select from a plurality of views to generate the image data based on the angle of the display screen 16.

The control circuit 114 may be in communication with a vehicle control module 126 via a communication bus 128 of the vehicle 12. The communication bus 128 may be configured to deliver signals to the control circuit 114 identifying various states of the vehicle 12. For example, the communication bus 128 may be configured to communicate an operating condition of the vehicle 12 (e.g., the ignition is active, a gear selection, a lighting activation or setting, etc.), an ambient light level, a seat occupancy, a door ajar signal, driver/occupant identity or any other information or control signals that may be communicated via the communication bus 128. In this way, the control circuit 114 may communicate with the vehicle control module 126 to identify a variety of conditions and/or settings of the vehicle 12.

Referring now to FIGS. 4 and 6, in some embodiments, the control circuit 114 may receive signals from one or more sensors or vehicle controls via the communication bus 128. For example, in some embodiments, the control circuit 114 may receive a seat adjustment position of a vehicle seat of the occupant 20. The vehicle seat position may comprise a fore-aft position, a reclining angle, a seat height, and various positional information that may be utilized to identify a position of a vehicular seat and the occupant 20. Based on the vehicle seat position, the control circuit 114 of the system 10 may identify an approximate location 130 of the occupant 20. For example, based on the seat position, the control circuit 114 may identify a range of positions in three-dimensions, wherein the head of the occupant 20 would likely be located based on typical body proportions of humans. Though only demonstrated in two-dimensions, the height data for the occupant 20 may also be indicated as a component of the approximate location 130. In this way, the range of positions identified from the seat position may define the approximate location 130 of the right eye 70 and the left eye 72 of the occupant 20 such that the approximate location 130 may be processed by the control circuit 114 to define a search window for the tracking sensor 80. In this way, the system 10 may utilize the seat adjustment position data received via the communication bus 128 to define a search window for the right eye 70 and the left eye 72 of the occupant 20.

In some embodiments, the display system 10 may be incorporated in a display similar to those disclosed in the following references. Examples of display assemblies that may be utilized with the disclosure may include U.S. Pat. No. 6,572,233 entitled "Rearview display mirror," U.S. Pat. No. 8,237,909 entitled "Vehicular rearview mirror assembly including integrated backlighting for a liquid crystal display (LCD)," U.S. Pat. No. 8,411,245 entitled "Multi-display mirror system and method for expanded view around a vehicle," and U.S. Pat. No. 8,339,526 entitled "Vehicle rearview mirror assembly including a high intensity display," which are incorporated herein by reference in their entirety.

The following references may include various implementations for imager systems providing rearward facing panoramic views and are incorporated herein by reference in their entirety: U.S. Pat. No. 8,237,909 B2 entitled "VEHICLE REARVIEW MIRROR ASSEMBLY INCLUDING INTEGRATED BACKLIGHTING FOR A LIQUID CRYSTAL DISPLAY (LCD), filed Feb. 6, 2009, by John B. Ostreko et al.; and U.S. Pat. No. 8,411,245 entitled "MULTI-DISPLAY MIRROR SYSTEM AND METHOD FOR EXPANDED VIEW AROUND A VEHICLE," filed Sep. 30, 2009, by Ethan J. Lee et al. Though the display system 10 in the various implementations disclosed herein is shown incorporated in a rearview display system, a display may similarly be incorporated in a vehicle forward center console, heads up display, or in any other location that may be visible to an operator of the vehicle 12.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle display device for a vehicle:
   a plurality of image sensors configured to capture image data;
   a tracking sensor configured to identify a position of an occupant;
   an image processor in communication with the image sensors and the tracking sensor, the image processor configured to generate stereoscopic image data from the image data, wherein the stereoscopic image data comprises right image data and left image data; and
   a display apparatus in communication with the image processor, the display apparatus disposed in a rearview display of the vehicle comprising a display panel comprising a display screen and an optical array, wherein the optical array is configured to communicate the stereoscopic image data from the display screen independently to each of a right eye and a left eye of the occupant based on the position of the occupant.

2. The display device according to claim 1, wherein the display apparatus comprises a pixel array comprising a plurality of pixels.

3. The display device according to claim 2, wherein the display apparatus is configured to activate a first portion of the plurality of pixels displaying the right image data and activate a second portion of the plurality of pixels displaying the left image data.

4. The display device according to claim 3, wherein the display apparatus comprises a parallax barrier disposed on a front surface of the pixel array between the pixel array and the occupant.

5. The display device according to claim 3, wherein the display apparatus comprises a lenticular lens disposed on a front surface of the pixel array between the pixel array and the occupant.

6. The display system according to claim 5, wherein the image processor controls the passage of the right image data and the left image data through the lenticular array by pairing light field rays of the pixels of the pixel array with retinal positions of the occupant.

7. The display system according to claim 5, wherein the right image data and the left image data are communicated to the occupant by selectively activating pixels of the pixel array aligned through the lenticular lens with the right eye and the left eye of the occupant respectively.

8. The display system according to claim 7, wherein the display apparatus is configured to direct the right image data to the right eye and the left image data to the left eye based on the position identified by the tracking sensor.

9. The display system according to claim 1, wherein the display system corresponds to an autostereoscopic display.

10. The display system according to claim 1, wherein the display system corresponds to a rearview display system.

11. The device according to claim 1, further comprising a position sensor configured to detect an angle of the display as an orientation relative to a forward operating direction of the vehicle, wherein the stereoscopic image data is generated based on the angle.

12. A display system for a vehicle comprising:
at least one image sensor configured to capture image data in a rearward directed field of view relative to a forward operating direction of the vehicle;
an image processor in communication with the image sensor and configured to generate autostereoscopic image data;
a display in connection with the vehicle and in communication with the image processor configured to display the autostereoscopic image data on a display screen, wherein the autostereoscopic image data is configured to provide a depth perception to assist in determining a proximity of an object in the image data; and
at least one sensor configured to detect a gesture of a user proximate to the display screen, wherein the display screen is configured to display a virtual user interface comprising three-dimensional graphical data and project the three-dimensional graphical data with the autostereoscopic image data to a user operating the vehicle from the display screen.

13. The display system according to claim 12, wherein the image sensor corresponds to a plurality of image sensors configured to generate a plurality of views of image data.

14. The display system according to claim 12, wherein the image processor is configured to generate at least one of an autostereoscopic image data and an automultiscopic image data from the plurality of views.

15. The display system according to claim 12, wherein the image processor is further operable to generate graphical data forming a three dimensional user interface on the display.

16. The display system according to claim 12, wherein the input sensor is configured to detect and distinguish the gesture of the user corresponding to the shape of the graphical data.

17. The display system according to claim 12, wherein the image processor is further configured to generate the autostereoscopic image data based on an angle of the display relative to a forward direction of the vehicle.

18. A vehicle display device for a vehicle:
a plurality of image sensors configured to capture image data;
a tracking sensor configured to identify a position of an occupant;
an image processor in communication with the image sensors and the tracking sensor, the image processor configured to generate stereoscopic image data from the image data, wherein the stereoscopic image data comprises right image data and left image data; and
a display apparatus in connection with the vehicle and in communication with the image processor, the display apparatus comprising a pixel array comprising a plurality of pixels and a lenticular lens, wherein the display apparatus is configured to:
activate a first portion of the plurality of pixels directing the right image data to a right eye of the occupant through the lenticular lens; and
activate a second portion of the plurality of pixels directing the left image data to a left eye of the occupant through the lenticular lens;
wherein the image processor is further configured to generate the autostereoscopic image data based on an angle of the display relative to a forward direction of the vehicle.

19. The device according to claim 18, further comprising a position sensor configured to detect the angle of the display relative to the forward operating direction of the vehicle.

* * * * *